(12) United States Patent
Tsumura et al.

(10) Patent No.: US 9,785,698 B2
(45) Date of Patent: Oct. 10, 2017

(54) BEHAVIORALLY CONSISTENT CLUSTER-WIDE DATA WRANGLING BASED ON LOCALLY PROCESSED SAMPLED DATA

(71) Applicants: Michael Tsumura, Richmond (CA); Ivailo Ivanov, Vancouver (CA); Viren Suresh Kumar, Vancouver (CA)

(72) Inventors: Michael Tsumura, Richmond (CA); Ivailo Ivanov, Vancouver (CA); Viren Suresh Kumar, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 318 days.

(21) Appl. No.: 14/588,022

(22) Filed: Dec. 31, 2014

(65) Prior Publication Data

US 2016/0188692 A1    Jun. 30, 2016

(51) Int. Cl.
- *G06F 7/00* (2006.01)
- *G06F 17/30* (2006.01)
- *H04L 29/08* (2006.01)

(52) U.S. Cl.
CPC .. *G06F 17/30598* (2013.01); *G06F 17/30569* (2013.01); *G06F 17/30876* (2013.01); *G06F 17/30896* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,424,969 B1 * | 7/2002 | Gruenwald | G06F 17/30569 707/802 |
| 8,682,906 B1 * | 3/2014 | Carasso | G06F 3/0484 707/749 |
| 8,751,499 B1 * | 6/2014 | Carasso | G06F 7/24 706/47 |

(Continued)

OTHER PUBLICATIONS

"European Application Serial No. 15003492.4, Office Action mailed May 30, 2016", 7 pgs.

(Continued)

*Primary Examiner* — Tuan A Pham
(74) *Attorney, Agent, or Firm* — Schwegman Lundberg & Woessner, P.A.

(57) ABSTRACT

Example embodiments involve a system, computer-readable storage medium storing at least one program, and computer-implemented method for behaviorally consistent data wrangling. A local client device selects a set of raw sample data from a remote datastore. A local execution engine then applies one or more local data wrangling operations to the raw sample data. If the results of the local data wrangling operations are satisfactory, the local data wrangling operations may then be transferred to a remote data wrangling cluster. A remote execution engine being executed by the remote data wrangling cluster then applies the data wrangling operations to the larger set of raw data from which the sample raw data was obtained. As the remote execution engine and the local execution engine are of the same type, the data wrangling behavior exhibited by the local execution engine is reflected in the data wrangling behavior of the remote execution engine.

14 Claims, 7 Drawing Sheets

(56) References Cited

U.S. PATENT DOCUMENTS

| | | | |
|---|---|---|---|
| 2012/0191678 A1* | 7/2012 | Liu | G06F 17/30598 |
| | | | 707/700 |
| 2013/0013552 A1* | 1/2013 | Eshleman | G06Q 10/00 |
| | | | 707/600 |
| 2014/0032518 A1 | 1/2014 | Cohen et al. | |

OTHER PUBLICATIONS

Parisot, Oliver, et al., "Data Wrangling: A Decisive Step for Compact Regression Trees", LNCD 8683, (2014), 60-63.

* cited by examiner

BEHAVIORALLY CONSISTENT CLUSTER-WIDE DATA WRANGLING BASED ON LOCALLY PROCESSED SAMPLED DATA

TECHNICAL FIELD

Example embodiments of the present application generally relate to data processing and, more particularly, to large scale data wrangling based on data wrangling performed on a smaller subset.

BACKGROUND

Data wrangling is the process of converting or mapping data from one "raw" form into another format that allows for more convenient consumption of the data. Such consumption may include further wrangling, data visualization, data aggregation, and training a statistical model, as well as many other potential uses. Data wrangling sometimes follows a set of general steps which begin with extracting the data in a raw form from the data source, "wrangling" the raw data using various hardware and/or software modules, parsing the data into predefined data structures, and depositing the resulting structured content into an accessible database for storage and future use.

Data wrangling is typically performed on large datasets and may be performed using various operations executable by different types of execution engines. However, when these types of operations are performed on small data sets, the operations run more slowly. Furthermore, if a user designs a set of wrangling operations, different execution engines may implement the designed set of wrangling operations differently. In other words, while one execution engine may be suitable for large datasets and a second execution may be suitable for smaller datasets, there is no guarantee that the behavior of the first and second execution engines will be equal. Thus, the output of the first and second execution engines can be different even if the requested data wrangling operations are the same.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
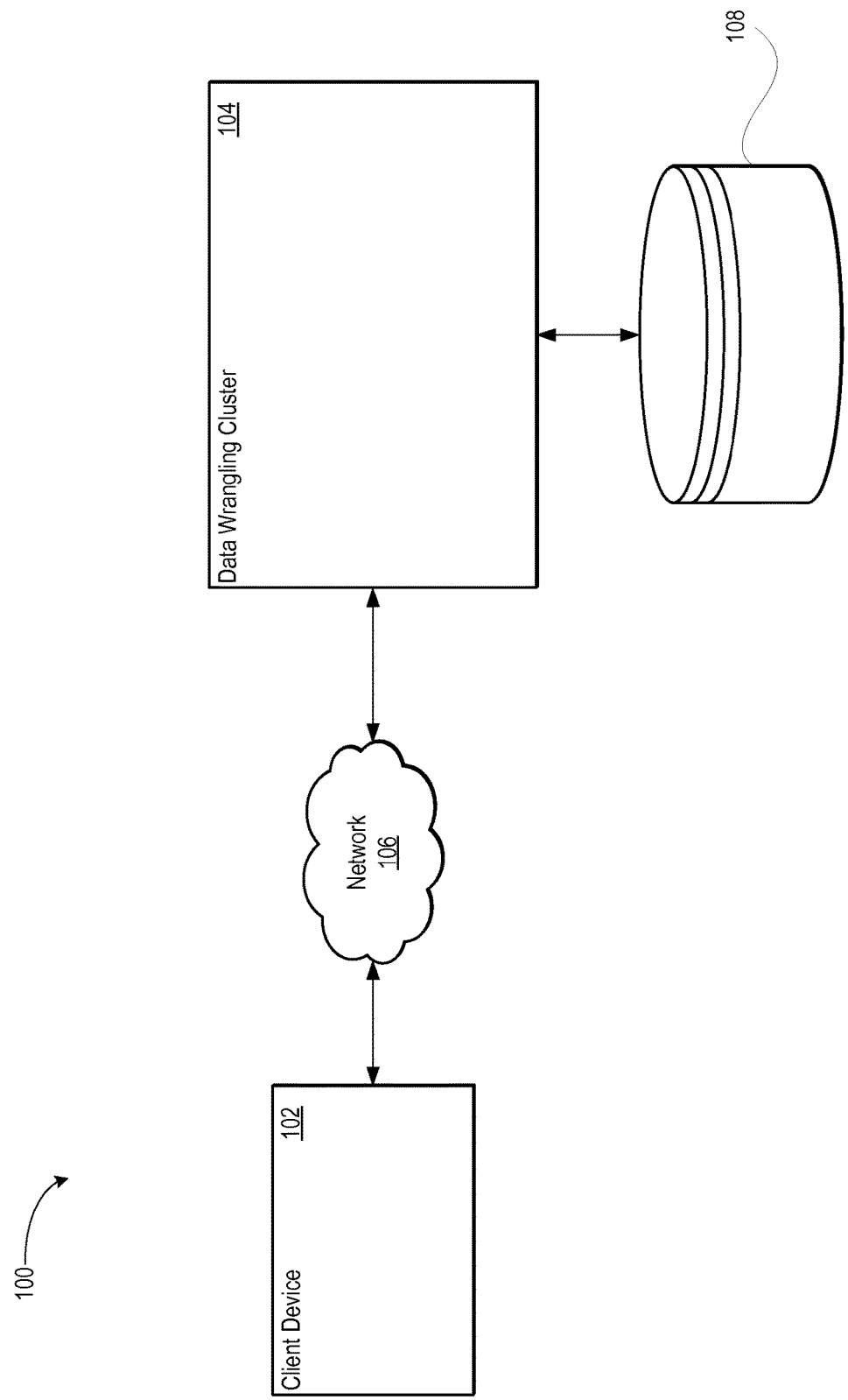
FIG. 1 is an architecture diagram illustrating a data wrangling platform in a distributed computing environment, according to an example embodiment, having a client-server architecture configured for exchanging data over a network.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve systems and methods for planning various data wrangling operations at a local client device, locally previewing the planned data wrangling operations, and applying the planned data wrangling operations at a remote device such that the resulting structured data at the remote device is structured as it was planned (e.g., previewed) at the local client device. In example embodiments, one or more users may plan and preview the data wrangling operations for one or more data records. For purposes of this disclosure, "data wrangling" refers to the technique of converting or mapping data from one format (e.g., a "raw" format) into another format that allows for more convenient consumption of the data. "Raw" data, which may also be called "primary" data, is a term for data collected from a source and which has not been subjected to processing or any other manipulation. Data wrangling involves transforming, structuring, or organizing the raw data in a way such that it may be consumed by another (e.g., a client device, application, etc.). For purposes of this disclosure, the term "data record" may refer to any item of stored information. For example, the term "data record" may be used to generally refer to a document or table stored in a database, or may be used to specifically refer to a field, member, or element of such a document or table.

Consistent with some embodiments, the local client device may instantiate or implement various applications or modules that assist a user in planning and/or previewing the data wrangling operations. In addition, the local client device may transfer a selected portion of a remotely stored dataset (e.g., one or more data records) to be processed. The technical benefit of transferring a selected portion of the dataset is that the memory and processor requirements for processing the sample data is relatively lower than having to store and process the entire dataset. A dataset may involve millions of data records and may be distributed across multiple datastores. Transferring such a large dataset to a local client device is impractical as it would require that the local client device have significant storage and processing capacity, which many local client devices do not.

In addition, the local client device may instantiate an execution engine (e.g., an application and/or module) designed to execute the planned data wrangling operations on the transferred portion of the dataset. Thus, the user of the local client device may locally preview the planned operations to see how the structured data may be organized for consumption by another (e.g., an application, another client device, etc.). Furthermore, a remote device may instantiate the same type of execution engine as the local client device so that when the user settles on the planned set of data wrangling operations, the remote execution engine produces structured data organized in a manner expected by the user. Different types of execution engines behave differently when provided with the same set of data wrangling operations; therefore, having the same type of execution engine at the local client device and the remote device has the technical benefit of ensuring that the data produced by the remote execution engine is organized in the same way as the data was organized by the local execution engine. Furthermore, having the same type of execution engine at the local client device and the remote device reduces the need to implement multiple different types execution engines depending on whether the execution engine is being implemented locally (e.g., at the client device) or remotely (e.g., at the remote device).

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is an architecture diagram illustrating a data wrangling platform 100 that includes a local client device 102 in communication with a data wrangling cluster 104, according to an example embodiment, via a network 106. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the data wrangling platform 100 to facilitate additional functionality that is not specifically described herein.

While the data wrangling platform 100 shown in FIG. 1 employs a client-server architecture, the disclosed subject matter is, of course, not limited to such an architecture, and could equally well find application in other architectures, such as an event-driven, distributed, or peer-to-peer architecture system. Further, the various functional components of the data wrangling platform 100 may be implemented as standalone systems or software programs, which do not necessarily have networking capabilities. Moreover, it shall be appreciated that although the various functional components of the data wrangling platform 100 are discussed in the singular sense, multiple instances of one or more of the various functional components may be employed.

As shown, the data wrangling platform 100 includes a data wrangling cluster 104 in communication with a local client device 102 over network 106. The data wrangling cluster 104 may also be communicatively coupled to a datastore 108. The data wrangling cluster 104 and the local client device 102 may connect to the network 106 through a variety of different mechanisms. For example, in some instances, the data wrangling cluster 104 and client device 102 may connect to the network 106 via a Wi-Fi connection (e.g., 802.11a/b/g/n), a Worldwide Interoperability for Microwave Access (WiMAX) connection, Bluetooth®, another type of wireless data connection, or combinations thereof. In such an embodiment, the network 106 may include one or more wireless access points coupled to a local area network (LAN), a wide area network (WAN), such as the Internet, or other packet-switched or circuit-switched data network. In other instances, the connection to the network 106 may be a wired connection, for example an Ethernet link, and the network 106 may be a LAN, a WAN, the Internet, or other packet-switched or circuit-switched data network.

Client device 102 may be any device or combination of devices configured to access the data wrangling cluster 104. In this regard, the client device 102 may include a desktop computer, a laptop computer, a personal digital assistant (PDA), a smartphone, a tablet computer, or any other kind of computing device. Furthermore, in some implementations, the client device 102 may include a combination of devices. The client device 102 may facilitate access to the data wrangling cluster 104 and/or the datastore 108.

The data wrangling cluster 104 may be configured to retrieve and process one or more data records stored in the datastore 108. In some instances, and as discussed below with reference to FIG. 3, the data wrangling cluster 104 may include several devices (e.g., nodes), such as servers, computers, and other such devices, configured to retrieve and process the data stored in the datastore 108. The data wrangling cluster 104 may instantiate a framework for analyzing and processing the data stored by the datastore 108, such as Apache Hadoop. Apache Hadoop is an open-source software framework for the distributed storage and processing of large amounts of data on one or more data clusters. In addition, the data wrangling cluster 104 may implement a filesystem to process the data of the datastore 108, such as the Hadoop Distributed File System (HDFS). HDFS splits files into large blocks (default 64 MB or 128 MB) and distributes the blocks among the nodes in the cluster. Additionally or alternatively, the data wrangling cluster 104 may implement other filesystems such as the Amazon S3 filesystem, the Windows Azure Storage Blobs (WASB), or any other such filesystem designed to support large amounts (e.g., petabytes, exabytes, zettabytes, etc.) of information.

The datastore 108 may be configured to store unstructured (e.g., raw) data for processing and organization by the data wrangling cluster 104. In one embodiment, the datastore 108 includes one or more data objects (e.g., data records). The data objects may be modelled using classes defined in a database schema. The database schema may define a logical and/or physical definition of the datastore 108 structure. Furthermore, while FIG. 1 illustrates the datastore 108 as a single construct, the datastore 108 may include one or more data storage constructs, such as one or more databases, one or more flat files, or combinations of the two. Additional types of data may include comma-separated values (CSV) files, JavaScript Object Notation (JSON) files, and other such files.

The data records stored by the datastore 108 may include many different types of data acquired from one or more sources. For example, the data may include weather data (e.g., temperature, pressure, rainfall, etc.) from weather stations, traffic data (e.g., traffic flow rate, weather conditions, etc.) from traffic monitoring stations, Global Positioning System (GPS) data acquired from one or more providers of GPS information, clickthrough behavior data (e.g., data relating to visitors of a web site clicking on web advertisements or other hyperlinks), and other such data. As the data stored by the datastore 108 is intended to be used in analytics and identifying behaviors, patterns, trends, and the like, the datastore 108 may be configured to store thousands or millions of data records. Thus, the amount of data stored by the datastore 108 is much larger relative to the amount of data stored by the client device 102.

Figure 2:
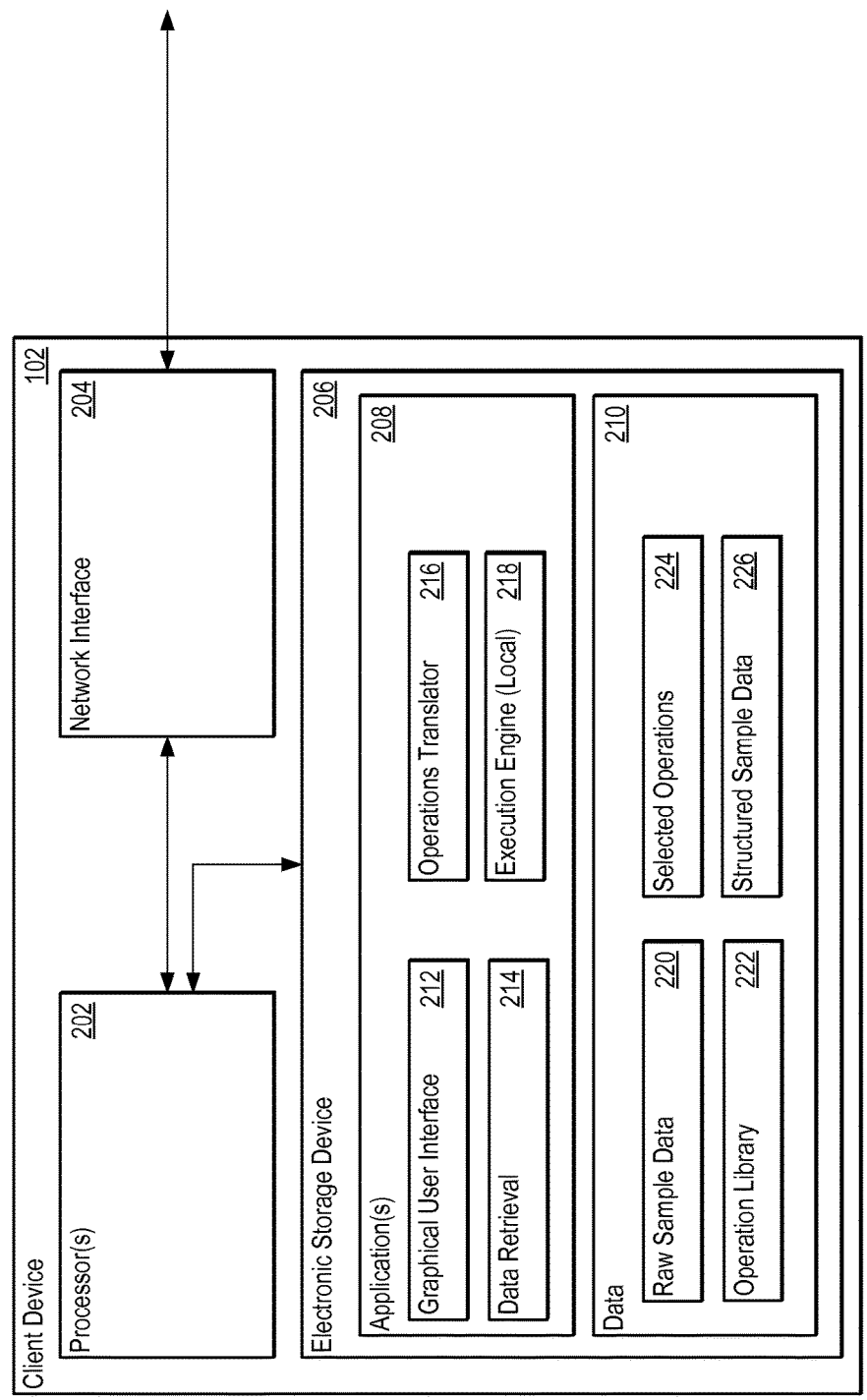
FIG. 2 is a block diagram of the client device of FIG. 1, according to an example embodiment, configured to perform local data wrangling operations.

The client device 102 may be configured to retrieve and locally process a selected sample of the data records stored in the datastore 108 via the data wrangling cluster 104. FIG. 2 is a block diagram of the client device 102, according to an example embodiment, of the data wrangling platform 100 of FIG. 1 configured to perform the local data wrangling operations. In one embodiment, the client device 102 includes one or more processors 202, a network interface 204, and an electronic storage device 206 (e.g., a non-transitory, computer-readable medium).

The various functional components of the client device 102 may reside on a single computer (e.g., a server), or may be distributed across several computers in various arrangements. The various components of the client device 102 may, furthermore, access one or more databases, and each of the various components of the client device 102 may be in communication with one another. Further, while the components of FIG. 2 are discussed in the singular sense, it will be appreciated that in other embodiments multiple instances of the components may be employed.

The one or more processors 202 may be any type of commercially available processor, such as processors available from the Intel Corporation, Advanced Micro Devices, Texas Instruments, or other such processors. Furthermore, the one or more processors 202 may be of any combination of processors, such as processors arranged to perform distributed computing.

The network interface 204 may be configured to send and/or receive data from the data wrangling cluster 104, such as data retrieved from the datastore 108. In that regard, the network interface 204 may be a wired interface, such as an Ethernet interface, a wireless interface, such as an 802.11g/n interface, or a combination of wired and wireless interfaces. The electronic storage device 206 may include a memory configured to store one or more application(s) 208 used to execute the local data wrangling operations and data 210 to support the one or more application(s) 208. As used herein, the term "memory" refers to a non-transitory, machine-readable medium able to store data temporarily or permanently and may be taken to include, but not be limited to, random-access memory (RAM), read-only memory (ROM), solid-state memory, an optical medium, a magnetic medium, or any suitable combination thereof. While the electronic storage device 206 is shown in an example embodiment to be a single device, the electronic storage device 206 may include a single device or multiple devices (e.g., a centralized or distributed database, or associated caches and servers) able to store information.

The application(s) 208 may include one or more applications and/or modules configured to facilitate the retrieval of a selected sample of data from the datastore 108. As is understood by skilled artisans in the relevant computer and Internet-related arts, each of the components 212-218 (e.g., a module or engine) may represent a set of executable software instructions and the corresponding hardware (e.g., memory and processor) for executing the instructions. In one embodiment, the application(s) 208 include a graphical user interface (GUI) 212, a data retrieval module 214, an operations translator 216, and an execution engine 218. The application(s) 208 may interact with data 210 stored in the electronic storage device 206, such as retrieved sample data 220, a library of data wrangling operations 222, selected data wrangling operations 224, and structured sample data 226. The various application(s) 208 and data 210 are discussed below.

As the local client device 102 is configured to retrieve and process a sample of the data stored in the datastore 108, the graphical user interface 212 may be configured to allow a user to select the sampling of data to retrieve via a data retrieval application and/or module 214. In that regard, the data retrieval application and/or module 214 may be a programmatic client being locally executed by the client device 102, a web client executing in an Internet browser, such as Microsoft® Internet Explorer®, or a combination of programmatic and/or web-based clients. Accordingly, the graphical user interface 212 may be a programmatic interface, a web-based interface, or a combination of programmatic and web-based interfaces.

In an additional or alternative embodiment, the data retrieval application and/or module 214 may display, via the graphical user interface 212, information about the data stored in the datastore 108 and may automatically retrieve a predetermined sample of the data on which to perform local data wrangling operations. Such information may include the type of raw data stored in the datastore 108, the number of data records stored in the datastore 108, the specific values for one or more data records of the raw data, and other such information. In selecting the raw sample data, a random (or pseudo-random) selection of the data stored in the datastore 108 may be retrieved by the client device 102. By using a pseudo-random selection of the data, the client device 102 may obtain a more representative portrayal of the data stored in the datastore 108. Furthermore, when selected data wrangling operations are applied to the pseudo-random sampling of data, the resulting structured data may provide a more representative result than if the selection was made by the user or automatically in an ordered (e.g., sequential) manner.

The selected sample of the raw data stored in the datastore 108 may be transferred to the client device 102 via the data wrangling cluster 104 and stored as the raw sample data 220. As discussed previously, the raw sample data 220 may be unstructured or unprocessed and in the form in which it was obtained from the data source.

The data 210 may include a library of data wrangling operations 222 that can be performed on the raw sample data 220. Examples of data wrangling operations include splitting a column of data, searching and replacing a given character or string of characters, or converting data from one type (e.g., a "string" data type) to a second type (e.g., a "date" data type).

In general, data wrangling operations 222 are performed by providing a command to a data wrangling application or module (e.g., an execution engine configured to execute the provided command). One or more of the data wrangling operations (e.g., the command provided to the execution engine) may be written in a computer programming, scripting, and/or query language. Examples of computer programming and scripting languages include Apache Pig, Scala, Java, Python, and other such programming or scripting languages. Examples of query languages include SQL or HQL. However, the user of the client device 102 may be unfamiliar with the syntax and usage of these languages.

Accordingly, the application(s) 208 may include an operations translator 216 for facilitating the selection of various data wrangling operations by a user. The operations translator 216 may be configured to retrieve the available data wrangling operations from the library of data wrangling operations 222. Furthermore, the available data wrangling operations may be displayed, via the GUI 212, in a spoken language, such as English, German, French, or other spoken language, so that a user can easily understand the data wrangling operations that are available to him or her. When a spoken language translation of a data wrangling operation is selected via the GUI 212, the operations translator 216 may provide the translated programming or scripting language version of the selected operation to the execution engine 218, along with any parameters or raw sample data 220 on which to perform the selected operation. Thus, the operations translator 216, working in conjunction with the GUI 212, helps a user understand which data wrangling operations are available to perform on the raw sample data 220 without the user having to know the computer programming or scripting command for carrying out those operations.

In addition, the operations translator 216 may be configured to protect the user from inadvertently selecting a data wrangling operation that is irrelevant to the raw sample data 220. In this regard, retrieval of the data wrangling operations from the library of data wrangling operations 222 and displayed to the user may be dependent on the raw sample data 220 retrieved from the datastore 108. Accordingly, in some instances, the raw sample data 220 may be categorized based on the type of data it represents, such as weather data, traffic data, Internet behavioral data, and other such data types, and the data wrangling operations retrievable from the library of data wrangling operations 222 may be assigned one or more of those data types (e.g., some data wrangling operations may be assigned more than one data type).

To illustrate by way of an example, a data wrangling operation in the library of data wrangling operations 222 may be assigned a temperature data type and may be written to convert values from Fahrenheit to Celsius. Should the raw sample data 220 be a data type other than a temperature data type (e.g., Internet users' clickthrough behavior for a website), such a temperature converting data wrangling operation may not be applicable for that raw sample data 220. Accordingly, in this example, the operations translator 216 may determine not to provide such an operation to the user. Alternatively or additionally, the irrelevant operation may be provided to the user via the GUI 212 (e.g., so that the user can see that this type of operation exists in the library of data wrangling operations 222), but the irrelevant operation may be non-selectable (e.g., "greyed out").

After the user has made his or her selections of data wrangling operations to apply to the raw sample data (or a portion thereof), the operations translator 216 may store such selected operations as the selected operations data 224. The selected operations 224, along with any provided parameters and/or raw sample data 220, may then be provided to a local execution engine 218.

The execution engine 218 may be configured to interpret and apply the selected operations 224 to the raw sample data 220. Notably, the execution engine 218 may be configured to operate in one or more modes, depending on whether the execution engine 218 is being executed within a data wrangling cluster (e.g., data wrangling cluster 104) or being executed on a device with comparatively less memory and processing resources (e.g., the client device 102). By configuring the execution engine 218 to operate in its "local mode" (e.g., by the client device 102) the execution engine 218 manages available resources more efficiently than if the execution engine 218 was configured to operate in its "cluster mode" (e.g., by one or more data nodes of the data wrangling cluster 104).

While the execution engine 218 may execute in a cluster mode or a local mode, the execution engine 218 may include additional or alternative modes as well. In one example, the execution engine 218 is Apache Spark, which has configurable data wrangling modes and is available from the Apache Software Foundation. Other examples of execution engines include High-Performance Computing Cluster Systems® (HPCC Systems) from LexisNexis Risk Management Solutions® and Apache Hadoop®, which is also available from the Apache Software Foundation.

After executing the one or more selected operations 224 on the raw sample data 220 (or a portion thereof), the execution engine 218 obtains a set of structured data, which may be stored as the structured sample data 226. Examples of structured sample data include Internet clickthrough behavior organized by time of day, traffic data sequentially ordered by velocity or speed (e.g., how fast each of the vehicles were traveling), advertising revenue grouped according to Internet Service Provider, and other such examples where raw data is organized into a structured format. In other words, the structured sample data 226 is meaningfully organized relative to the raw sample data 220.

The structured sample data 226 may be displayed to the user via the GUI 212. The structured sample data 226 may be displayed to the user so that the user gains an understanding of how the selected operations 224 organize the raw sample data 220, and ultimately, the dataset from where the raw sample data 220 was selected. Should the user find the results of the selected operations 224 satisfactory, the user may communicate the selected operations 224 to the data wrangling cluster 104, which may then perform the selected operations 224 on the dataset stored in the datastore 108. Alternatively or additionally, the user may select additional or different data wrangling operations to apply to the structured sample data 226 and/or the raw sample data 220, select another sample of raw data on which to apply the selected data wrangling operations, and/or select another sample of raw data 220 on which to apply a different set of data wrangling operations. Thus, the user has flexibility in deciding how the raw sample data 220 should be structured based on the applied data wrangling operations.

Figure 3:
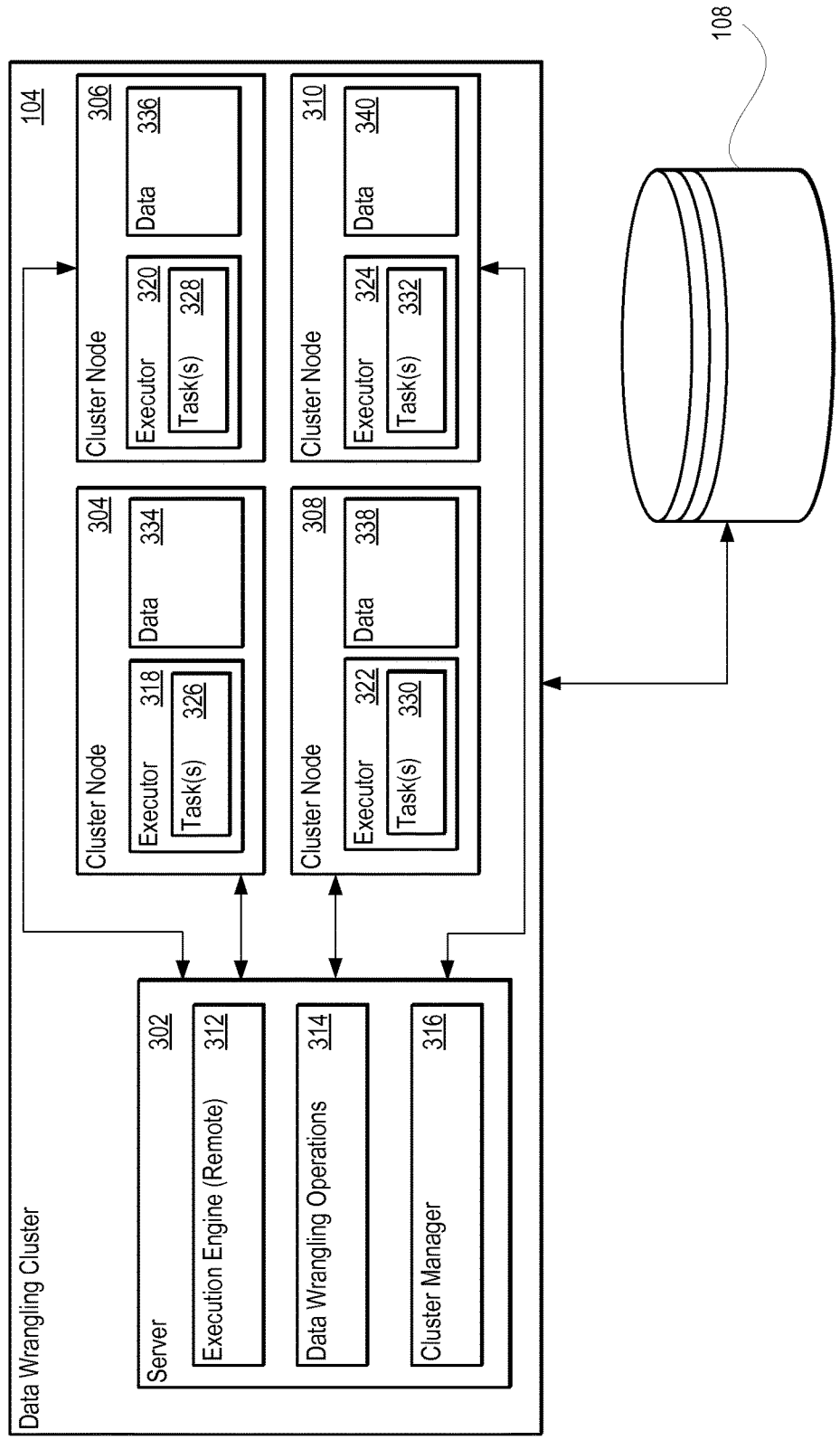
FIG. 3 is a block diagram of the data wrangling cluster of FIG. 1, according to an example embodiment, configured to perform remote data wrangling operations.

When it is determined that the selected operations 224 are satisfactory or complete, the selected operations 224 may be communicated to the data wrangling cluster 104 for performing the selected operations 224 on the raw data stored in the datastore 108. FIG. 3 is a block diagram of the data wrangling cluster 104, according to an example embodiment, configured to perform remote data wrangling operations. The data wrangling cluster 104 may include a set of loosely or tightly connected computers that work together. As shown in FIG. 3, the data wrangling cluster 104 may include one or more cluster nodes 304-310 configured to perform a task assigned by the cluster server 302.

The components (e.g., server 302 and nodes 304-310) of the data wrangling cluster 104 may be connected through one or more networks (e.g., one or more wired and/or wireless networks) where each cluster node 304-310 executes its own instance of an operating system. The cluster nodes 304-310 may be configured with the same hardware and the same operating system, although some configurations of different operating systems can be used on each computer, and/or different hardware.

To that end, the server 302 and/or cluster nodes 304-310 may include one or more components found in a computer. While not illustrated in FIG. 3, one of ordinary skill in the art will understand that these components may include one or more processors, one or more network interfaces, one or more electronic storage devices (e.g., one or more non-transitory, computer-readable media), various input and/or output devices (e.g., keyboard, mouse, display, etc.), and other such components found in a computer.

As shown, the various components 312-316 of the server 302 may be configured to communicate with each other (e.g., via a bus, shared memory, a switch, or application programming interfaces (APIs)). In addition, the various functional components 312-316 of the server 302 may reside on a single computer or may be distributed across several computers in various arrangements. The various components 312-316 of the server 302 may, furthermore, access one or more databases, and each of the various components 312-316 of the server 302 may be in communication with one another. Further, while some of the components 312-316 of FIG. 3 are discussed in the singular sense, it will be appreciated that in other embodiments multiple instances of the components may be employed.

The server 302 may be configured to apply the selected data wrangling operations 224 to the raw data (or portions thereof) stored in the datastore 108. Accordingly, the server 302 may receive the selected data wrangling operations 224 and store such operations as the data wrangling operations 314 in an electronic storage device. The server 302 may further include an execution engine 312, which may be implemented as an application, module, or combination thereof, and be configured to apply the data wrangling operations 314 to the raw data. In this regard, the execution engine 312 may be the same type of execution engine instantiated by the local client device 102 (e.g., execution engine 218), but configured to operate in a "cluster mode" that takes advantage of the computing resources available to the server 302.

When configured to operate in a cluster mode, the execution engine 312 may operate in conjunction with a cluster manager 316, discussed below, to take advantage of the additional computing resources (e.g., transitory memory, non-transitory memory, processors, etc.) available to the execution engine 312. Thus, where the local client device instantiates Apache Spark operating in a local mode, the server 302 instantiates Apache Spark operating in a cluster mode. The technical benefit obtained by instantiating the same type of execution engine at the local client device 102 and at the server 302 is that the data wrangling platform 100 ensures that the same data wrangling behavior is exhibited both by the execution engines 218,312. In other words, the implementation of the same type of execution engine ensures that the structured data obtained by the data wrangling cluster 104 is consistent with the structured data obtained by the local client device 102.

To leverage the resources of the data wrangling cluster 104, the server 302 may include a cluster manager 316, which may be implemented as an application, module, or combination thereof. Examples of cluster managers include Apache Spark Standalone, Apache Mesos, Hadoop YARN, and other such cluster managers.

In general, the cluster manager 316 allocates resources from each of the data nodes 304-310 based on the resource needs of the execution engine 312. Accordingly, the cluster manager 316 may be configured to distribute one or more of the data wrangling operations 314 to the cluster nodes 304-310 based on instructions provided by the execution engine 312. Furthermore, the cluster manager 316 may receive instructions from the execution engine 312 that include which of the raw data from the datastore 108 should be processed using the data wrangling operations 314, and the cluster manager 316 may assign a set of data wrangling operations along with the assigned raw data to a given cluster node 304-310 for processing. As the cluster nodes 304-310 complete their assigned data wrangling operations for a given set of raw data, a given cluster node 304-310 may inform the cluster manager 316 of its availability and wait for further instructions from the cluster manager 316.

Although FIG. 3 illustrates that the server 302 is in communication with the cluster nodes 304-310, additional or alternatively communication pathways may also be possible. For example, the cluster nodes 304-310 may communicate with each other such that the various cluster nodes 304-310 are aware of the various operations they are performing. In this way, the management of tasks assigned to the cluster nodes 304-310 may be decentralized.

In this regard, the cluster nodes 304-310 may store the assigned data wrangling operations and the assigned raw data to be processed using the assigned data wrangling operations. Accordingly, the assigned data wrangling operations may be stored as tasks 326-332, and the raw data may be stored as data 334-340 for each of the cluster nodes 304-310. In one embodiment, the data 334-340 is stored in a non-transitory, computer-readable medium accessible by a given cluster node 304-310 (e.g., random access memory (RAM), a hard drive, an optical drive, etc.). Furthermore, each of the cluster nodes 304-310 may instantiate an executor 318-324, implemented as an application, module, or combination thereof, which is configured to perform the assigned data wrangling operations on the assigned raw data. In one embodiment, an executor is a process launched for the execution engine 312 on a given cluster node 304-310 that runs tasks and keeps data in memory or disk storage across the cluster nodes 304-310 (e.g., a shared memory space). Should the server 302 instantiate or implement more than one execution engine, each of the execution engines would request its own set of executors. Thus, in some embodiments, an executor may be assigned to one execution engine. In other embodiments, an executor may be shared across execution engines.

As a cluster node 304-310 completes its assigned tasks 326-332 (e.g., applying assigned data wrangling operations to raw data), the cluster node 304-310 may obtain structured data as a result. The structured data may be stored as data 334-340 as the cluster nodes 304-310 complete their assigned tasks 326-332. In one embodiment, the cluster node 304-310 communicates the resulting structured data in predetermined amounts (e.g., as it is obtained, every 10 megabytes, every 10 gigabytes, etc.) to the cluster manager 316, which may then handle the storing of such structured data. In an alternative embodiment, the cluster nodes 304-310 store the resulting structured data as data 334-340 until all of the raw data assigned to a given node is processed, at which point, the node may then communicate the structured data to the cluster manager 316. In an alternative embodiment, the cluster node 304-310 may handle the storing of the structured data and may inform the cluster manager 316 when it has stored the resulting structured data and/or completed its assigned tasks.

In one embodiment, the structured data obtained by the data wrangling cluster 104 may be stored in the datastore 108 communicatively coupled to the data wrangling cluster 104. Additionally or alternatively, the structured data may be stored in its own datastore (not shown).

As discussed above, the structured data may be meaningfully organized relative to the raw data. As examples, the structured data may include Internet clickthrough behavior organized by time of day, traffic data sequentially ordered by velocity or speed (e.g., how fast each of the vehicles were traveling), advertising revenue grouped according to Internet Service Provider, and other such structured data. The structured data may be accessible by devices other than the data wrangling cluster 104 such that the stored structured data may be reviewed and analyzed. For example, and with reference to FIG. 2, the local client device 102 may retrieve the structured data and analyze it to determine whether there are any trends or patterns in the data.

Figure 4:
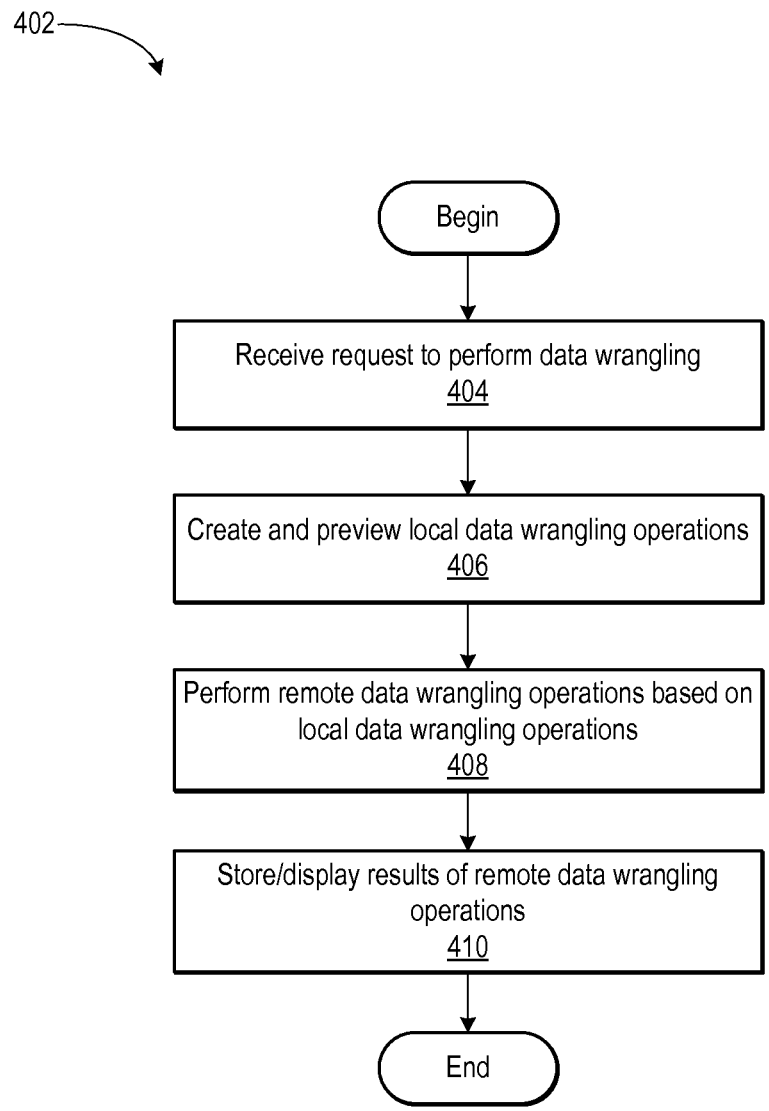
FIG. 4 is a flow chart illustrating a method, in accordance with an example embodiment, for preparing and previewing data wrangling operations.

FIG. 4 is a flow chart illustrating a method 402, in accordance with an example embodiment, for preparing and previewing data wrangling operations. The method 402 may be implemented by one or more components of the data wrangling platform 100 and, accordingly, is merely described by way of reference thereto.

Initially, the data wrangling cluster 104 (e.g., the server 302) may receive a request to perform one or more data wrangling operations on the raw data of the datastore 108 (Operation 404). The local client device 102 may then create and preview one or more local data wrangling operations, discussed below with reference to FIG. 5, on a sample of the raw data stored in the datastore 108 (Operation 406). One or more of the local data wrangling operations may then be communicated to the data wrangling cluster 104 for performing the local data wrangling operations as remote data wrangling operations on the raw data (or a portion thereof) of the datastore 108 (Operation 408). Performing the remote data wrangling operations is discussed further below with reference to FIG. 6. The results of applying the remote data wrangling operations (e.g., structured data) may then be stored in the datastore 108 and/or communicated for display by the local client device 102 (Operation 410).

Figure 5:
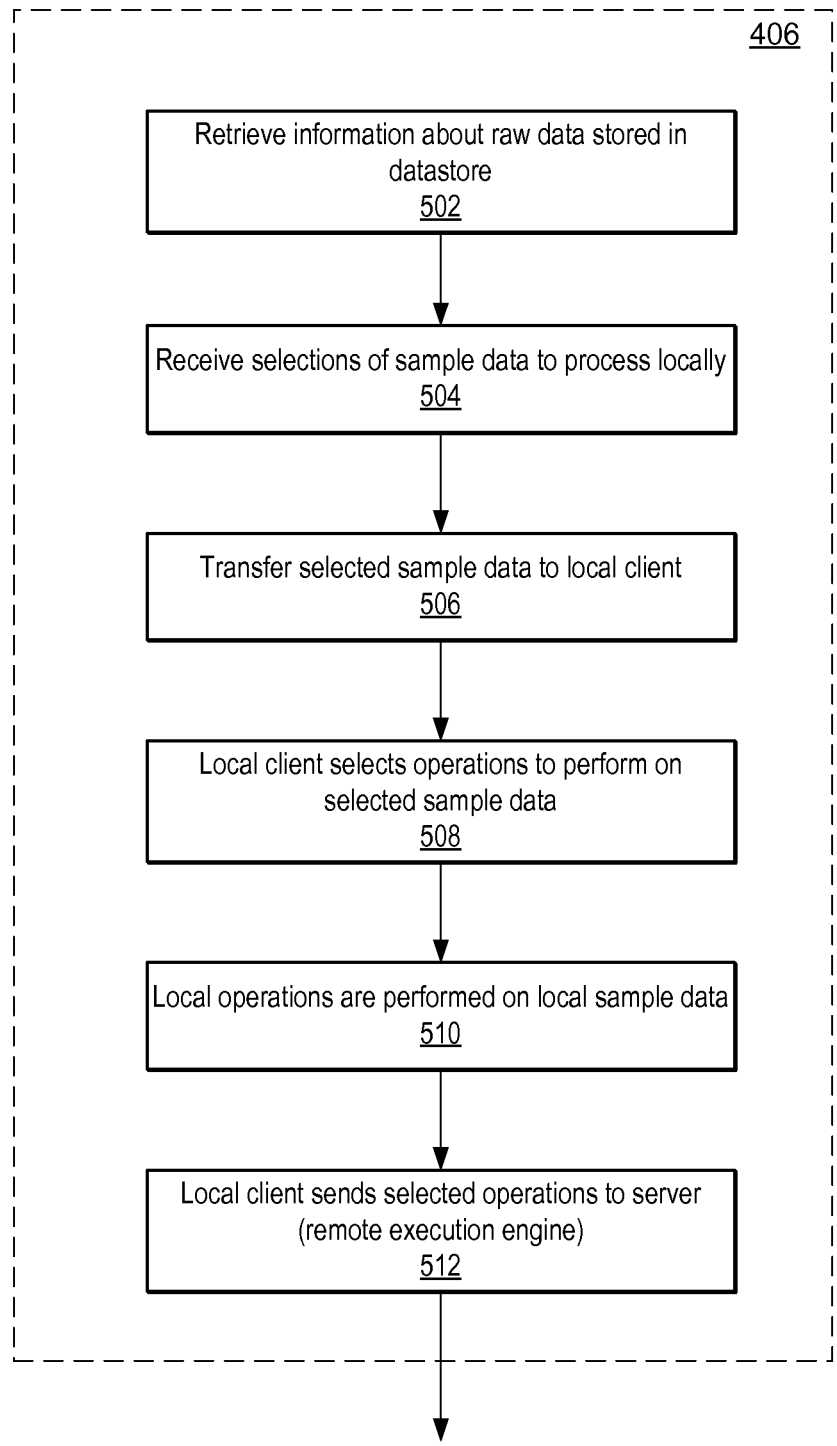
FIG. 5 is a flow chart illustrating an operation of FIG. 4, in accordance with an example embodiment, for preparing and previewing local data wrangling operations at the local client device of FIG. 1.

FIG. 5 is a flow chart illustrating the Operation 406, in accordance with an example embodiment, for preparing and previewing local data wrangling operations at the local client device 102. Initially, and with reference to FIG. 1, the data wrangling cluster 104 may retrieve information about the raw data from the datastore 108 for sending to the local client device 102 (Operation 502). Such information may include the type of raw data stored in the datastore 108, the number of data records stored in the datastore 108, the specific values for one or more data records of the raw data, and other such information. One or more applications and/or modules of the local client device 102 may use this information, such as the data retrieval module 214, to select the sample raw data to transfer to the local client device 102 (Operation 504). After the raw sample data is selected (e.g., by a user of the local client device 102, pseudo-randomly, sequentially, etc.), the selected raw data is transferred to the client device 102 as the raw sample data 220 (Operation 506).

Having received the raw sample data 220, the local client device 102 may then receive selections of one or more data wrangling operations to perform on the raw sample data 220 (Operation 508). The selections of the data wrangling operations may be received manually (e.g., a user using the local client device 102), automatically (e.g., the operations translator 216 is configured with predetermined selections), or a combination thereof.

As discussed previously, the data wrangling operations to be performed on the raw sample data 220 may be retrieved from a library of data wrangling operations 222 and, further still, may be displayed in a spoken-language form (e.g., English, German, French, etc.) via the GUI 212. Data wrangling operations selected from the library of data wrangling operations 222 may be stored as the selected data wrangling operations 224. These operations may then be executed via an execution engine 218, such as Apache Spark, operating in a mode selected from a plurality of modes (e.g., a local mode) (Operation 510).

The results of applying the selected data wrangling operations 224 may be displayed via the GUI 212 as the structured sample data 226. In some instances, the GUI 212 may receive a manual confirmation that the selected data wrangling operations 224 are satisfactory. For example, should the user of the local client device 102 find the structured sample data 226 agreeable, the user may instruct the client device 102 to send the selected operations 224 to the data wrangling cluster 104 to perform the selected operations 224 on the raw data (or portion thereof) stored in the datastore 108 (Operation 512).

Figure 6:
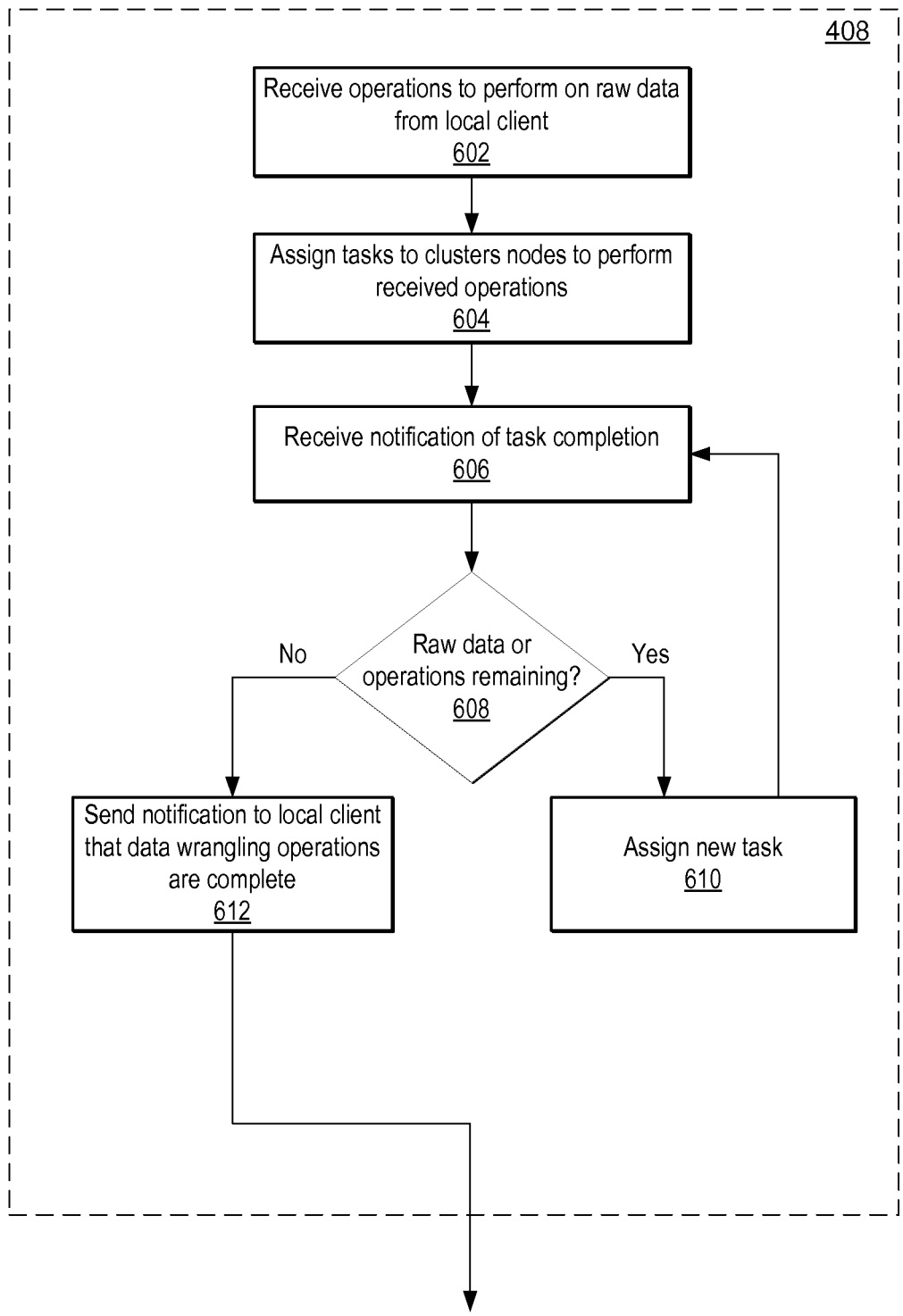
FIG. 6 is a flow chart illustrating another operation of FIG. 4, in accordance with an example embodiment, for executing selected data wrangling operations by the data wrangling cluster device of FIG. 1.

FIG. 6 is a flow chart illustrating Operation 408 FIG. 4, in accordance with an example embodiment, for executing selected data wrangling operations by the data wrangling cluster of FIG. 1. Initially, and with reference to FIGS. 2 and 3, the data wrangling cluster 104 may receive the selected data wrangling operations to perform on the raw data (or a portion thereof) stored in the datastore 108 (Operation 602). Accordingly, the received data wrangling operations may be stored as the data wrangling operations 314. The execution engine 312, operating in a cluster mode, may request various resources from the cluster manager 316 to perform the data wrangling operations 314. In turn, the cluster manager 316 may assign one or more of the cluster nodes 304-310 with one or more tasks for performing the data wrangling operations 314 (Operation 604). As discussed previously, the tasks may include the one or more data wrangling operations to perform along with the raw data (or references to the raw data) on which to perform the assigned data wrangling operations. As the cluster nodes 304-310 complete their assigned tasks, one or more cluster nodes 304-310 may store the results of the assigned tasks (e.g., the structured data obtained from the raw data) in one the datastore 108 or in one or more datastores.

Furthermore, the cluster nodes 304-310 may inform the cluster manager 316 of task completions (Operation 606). In some instances, the cluster nodes 304-310 inform the cluster manager 316 about each task completion (e.g., one task at a time). In other embodiments, the cluster nodes 304-310 inform the cluster manager 316 as they complete their entire set of assigned tasks. By informing the cluster manager 316 of the task completions, the cluster manager 316 is able to keep track of which cluster nodes 304-310 are available for performing additional tasks and the available resources for performing any remaining data wrangling operations.

As the cluster manager 316 receives notifications of task completions, the cluster manager 316 or execution engine 312 may determine whether any data wrangling operations or raw data remain for processing by the cluster nodes 304-310 (Operation 608). Should a determination be made that there are remaining data wrangling operations or raw data, the cluster manager 316 may assign these data wrangling operations and/or raw data as new tasks for one or more of the cluster nodes 304-310 to perform (Operation 610). Alternatively, should a determination be made (e.g., by either the cluster manager 316 and/or the execution engine 312) that the data wrangling operations have been performed and/or that no raw data remains for processing, the cluster manager 316 may inform the execution engine 312 that all of the data wrangling operations 314 has been performed. In turn, the execution engine 312, by way of the server 302, may inform the local client device 102 (or another client device configured to receive such notifications) that the data wrangling operations 314 are complete (Operation 612)

Figure 7:
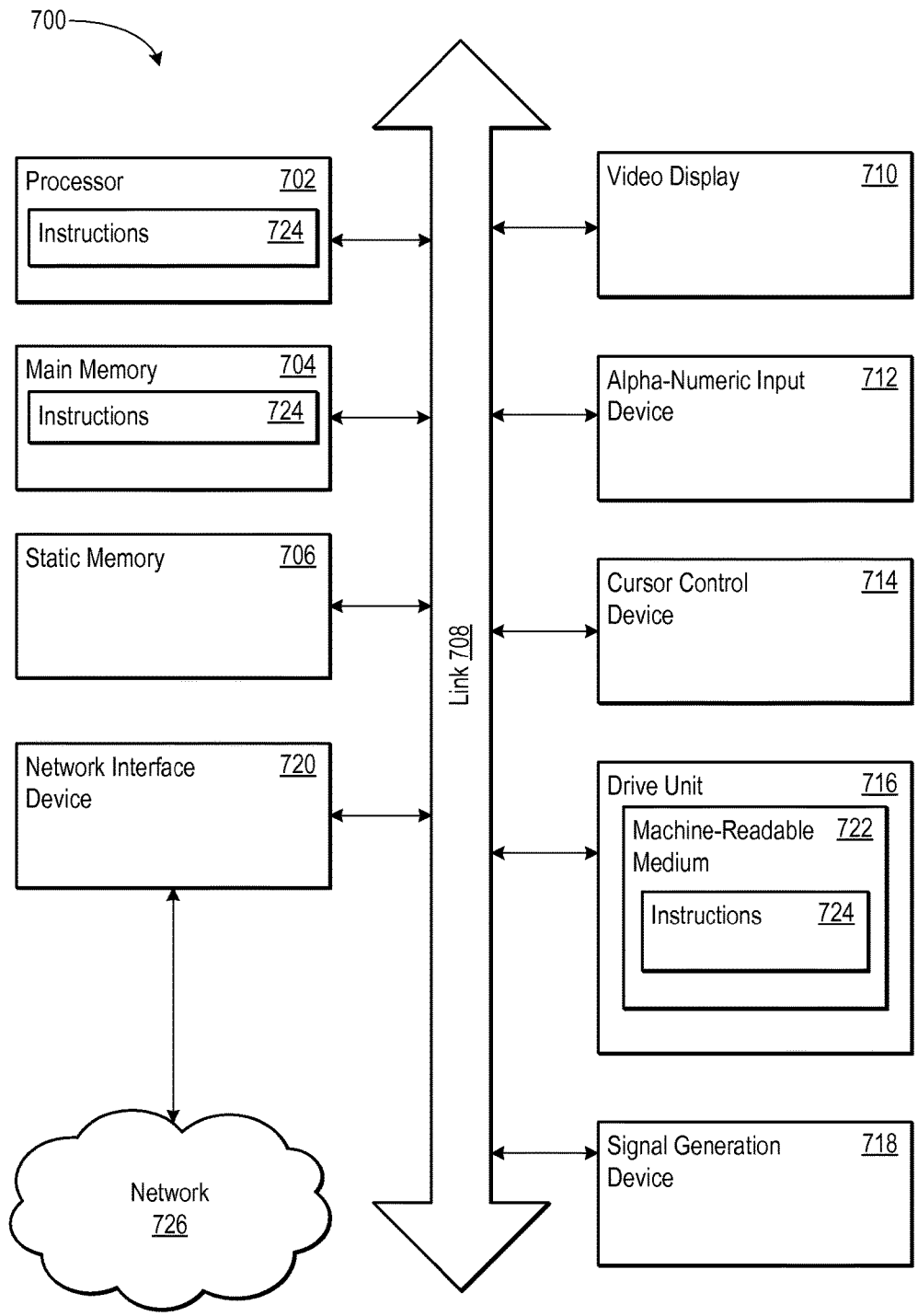
FIG. 7 is a diagrammatic representation of a machine in the example form of a computer system within which a set of instructions for causing the machine to perform any one or more of the methodologies discussed herein may be executed.

FIG. 7 is a block diagram illustrating components of a machine 700, in accordance with an example embodiment, configured to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative examples, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a PDA, a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which are stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A method comprising:
    selecting, at a local client device, a first plurality of raw data from a second plurality of raw data, the second plurality of raw data being stored remote from the local client device and accessible by a remote device;
    receiving the first plurality of raw data at the local client device;
    selecting, from a library of data wrangling operations at the local client device, a plurality of data wrangling operations to perform on the first plurality of raw data;
    instantiating, at the local client device, a first data wrangling module operating in a first mode selected from a first plurality of modes, the first mode being selected based on computing resources available to the local client device;
    applying, using at least one hardware processor of the local client device, the plurality of data wrangling operations to the first plurality of raw data using the first mode of the first data wrangling module to obtain a first plurality of structured data;
    causing presentation, via a user interface of the local client device, of the first plurality of structured data;
    receiving, via the user interface of the local client device, after the causing of the presentation of the first plurality of structured data, an input indicating approval of the first plurality of structured data; and sending, in response to receiving the input, the selection of the plurality of data wrangling operations to the remote device, the remote device being configured to:
  instantiate a second data wrangling module operating in a second mode selected from a plurality of modes; and
  apply the selected plurality of data wrangling operations to the second plurality of raw data using the second mode of the second data wrangling module to obtain a second plurality of structured data, the second plurality of structured data having an expected organization based on the first plurality of structured data.

2. The method of claim 1, further comprising:
receiving a notification from the remote device that the data wrangling operations have been applied to the second plurality of raw data.

3. The method of claim 1, wherein the first plurality of raw data is a subset of the second plurality of raw data.

4. The method of claim 1, wherein the first plurality of structured data is meaningfully organized relative to the first plurality of raw data.

5. The method of claim 1, wherein the remote device comprises a cluster of nodes, and at least one node is selected from the cluster of nodes to perform at least one data wrangling operation selected from the plurality of data wrangling operations on a subset of the second plurality of raw data.

6. A system comprising:
one or more processors at a local client device; and
a memory storing instructions that, when executed by at least one of the one or more processors, cause the local client device to perform operations comprising:
  selecting a first plurality of raw data from a second plurality of raw data, the second plurality of raw data being stored remote from the local client device and accessible by a remote device;
  receiving the first plurality of raw data;
  selecting, from a library of data wrangling operations, a plurality of data wrangling operations to perform on the first plurality of raw data;
  instantiating a first data wrangling module operating in a first mode selected from a first plurality of modes, the first mode being selected based on computing resources available to the local client device;
  applying the plurality of data wrangling operations to the first plurality of raw data using the first mode of the first data wrangling module to obtain a first plurality of structured data;
  causing presentation, via a user interface, of the first plurality of structured data;
  receiving, via the user interface, after the causing of the presentation of the first plurality of structured data, an input indicating approval of the first plurality of structured data; and
  sending, in response to receiving the input, the selection of the plurality of data wrangling operations to the remote device, the remote device being configured to:
    instantiate a second data wrangling module operating in a second mode selected from a plurality of modes; and
    apply the selected plurality of data wrangling operations to the second plurality of raw data using the second mode of the second data wrangling module to obtain a second plurality of structured data, the second plurality of structured data having an expected organization based on the first plurality of structured data.

7. The system of claim 6, the operations further comprising:
receiving a notification from the remote device that the data wrangling operations have been applied to the second plurality of raw data.

8. The system of claim 6, wherein the first plurality of raw data is a subset of the second plurality of raw data.

9. The system of claim 6, wherein the first plurality of structured data is meaningfully organized relative to the first plurality of raw data.

10. The system of claim 6, wherein the remote device comprises a cluster of nodes, and at least one node is selected from the cluster of nodes to perform at least one data wrangling operation selected from the plurality of data wrangling operations on a subset of the second plurality of raw data.

11. A non-transitory, computer-readable medium storing computer-executable instructions that, when executed by one or more processors of a local client device, cause the local client device to perform operations comprising:
  selecting a first plurality of raw data from a second plurality of raw data, the second plurality of raw data being stored remote from the local client device and accessible by a remote device;
  receiving the first plurality of raw data at the local client device;
  selecting, from a library of data wrangling operations, a plurality of data wrangling operations to perform on the first plurality of raw data;
  instantiating a first data wrangling module operating in a first mode selected from a first plurality of modes, the first mode being selected based on computing resources available to the local client device;
  applying the plurality of data wrangling operations to the first plurality of raw data using the first mode of the first data wrangling module to obtain a first plurality of structured data;
  causing presentation, via a user interface, of the first plurality of structured data;
  receiving, via the user interface, after the causing of the presentation of the first plurality of structured data, an input indicating approval of the first plurality of structured data; and
  sending, in response to receiving the input, the selection of the plurality of data wrangling operations to the remote device, the remote device being configured to:
    instantiate a second data wrangling module operating in a second mode selected from a plurality of modes; and
    apply the selected plurality of data wrangling operations to the second plurality of raw data using the second mode of the second data wrangling module to obtain a second plurality of structured data, the second plurality of structured data having an expected organization based on the first plurality of structured data.

12. The non-transitory, computer-readable medium of claim 11, wherein the operations further comprise:
receiving a notification from the remote device that the data wrangling operations have been applied to the second plurality of raw data.

13. The non-transitory, computer-readable medium of claim 11, wherein the first plurality of raw data is a subset of the second plurality of raw data.

14. The non-transitory, computer-readable medium of claim 11, wherein the first plurality of structured data is meaningfully organized relative to the first plurality of raw data.

\* \* \* \* \*